Fig. 1

INVENTORS
JOSEPH F. TYE
BURDETTE W. FOSS
BY
Edmund N.E. Kamm
ATTORNEY

INVENTORS
JOSEPH F. TYE
BURDETTE W. FOSS
BY
Edmund W. Kamm
ATTORNEY

Fig. 6

INVENTORS
JOSEPH F. TYE
BURDETTE W. FOSS
BY
Edmund W. E. Kamm
ATTORNEY

April 28, 1964  J. F. TYE ETAL  3,130,871
MOTOR FUEL BLENDER

Filed Sept. 24, 1962  7 Sheets-Sheet 7

INVENTORS
JOSEPH F. TYE
BURDETTE W. FOSS
BY
Edmund W. E. Kamm
ATTORNEY

United States Patent Office 3,130,871
Patented Apr. 28, 1964

3,130,871
MOTOR FUEL BLENDER
Joseph F. Tye and Burdette W. Foss, Fort Wayne, Ind., assignors to Tokheim Corporation, Fort Wayne, Ind., a corporation of Indiana
Filed Sept. 24, 1962, Ser. No. 225,664
20 Claims. (Cl. 222—35)

This invention relates to motor fuel blenders. More specifically it relates to a blender in which mechanism is set to dispense a particular ratio of the two fuels to be blended so that all deliveries made from the blender will be of the same blend. Means are provided however, for establishing different ratios of the two fuels.

It is an object of the invention to provide a blender of the type indicated which will provide an accurate blend of constituents despite varying conditions such as pump pressure, depth of fuel in the storage tank and other variable factors commonly found in fuel dispensing systems.

A further object of the invention is to provide a blender which will be compact and reliable.

Another object of the invention is to provide a blending mechanism which can be incorporated in either motor pump or remote pedestal type of dispenser and which can be installed in either a service island unit or in an above ground unit or in a pit, remote from the service island.

These and other objects will become apparent from a study of this specification and the drawings which are attached hereto, form a part hereof and in which.

GENERAL STRUCTURE

Figure 1:
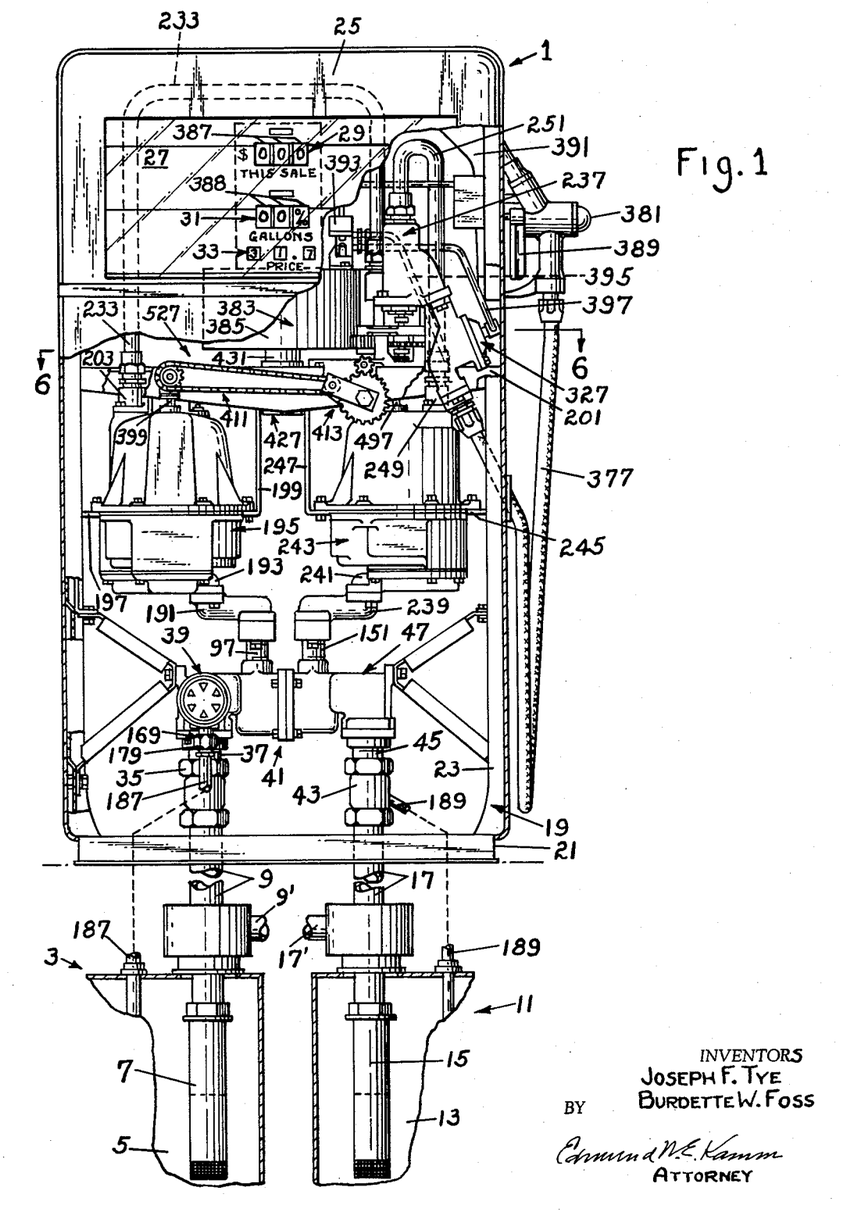
FIGURE 1 is an elevational view with parts in section showing a remote pedestal type of island dispenser equipped with proportioner, for dispensing a motor fuel which is a blend of two motor fuels.

Referring to FIGURE 1 of the drawings, the numeral 1 generally indicates an island dispenser of the remote pedestal type, for dispensing a liquid motor fuel which is a blend of two different motor fuels, hereinafter referred to for convenience "low" and "high" fuel which are in practice similar to low octane or regular fuel and high octane or premium fuel respectively.

The numeral 3 designates means for supplying low gasoline to the dispensing apparatus, which means includes a storage tank 5, a motor-pump unit 7 and a conduit 9 connected to the dispenser. The apparatus for supplying high gasoline to the dispenser 1 is indicated generally by the numeral 11 and includes a storage tank 13, a motor-pump unit 15 and a discharge conduit 17, connecting the pump 15 to the dispenser.

The motor-pump units 7 and 15 shown are of the submerged type, however, suction type power pumps may be used.

The apparatus comprising the dispenser disclosed herein is supported on a framework 19 which includes a base 21 and a frame 23 rising vertically from the base. The apparatus, including the frame 21 is enclosed in a housing 25 which includes a dial 27 provided with openings 29, 31 and 33 for respectively displaying the dials of the registers 387 and 388 showing the cost of the sale and the quantity sold, and dials of the variator 383 which show the unit price at which the cost of sale is being computed.

Figure 2:
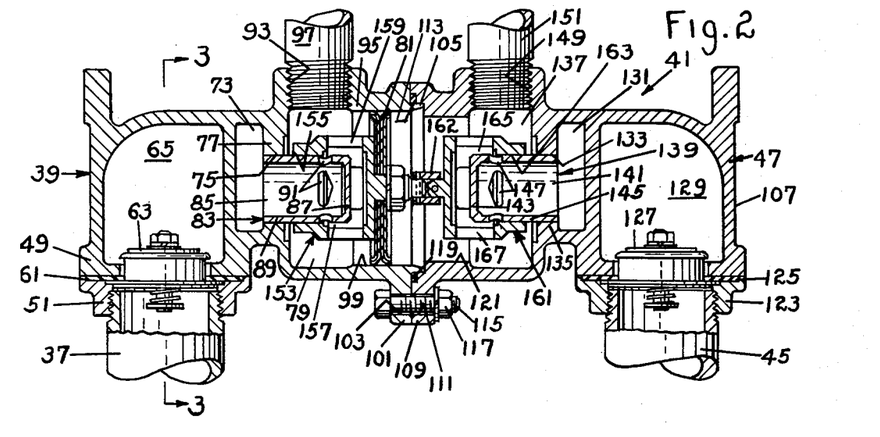
FIGURE 2 is a sectional view of a valve for balancing the inlet pressures to the meters of the proportioner.

The conduit 9 is connected by a pipe coupling 35 to the inlet pipe 37 of the dispenser, which supplies low fuel to one side 39 of a pressure balancing valve 41 (FIG. 2).

PRESSURE EQUALIZING VALVES

The conduit 17 from the motor pump 15 is connected by a coupling 43 to a pipe 45 which supplies high fuel to the other side 47 of the pressure balancing valve 41.

Figure 3:
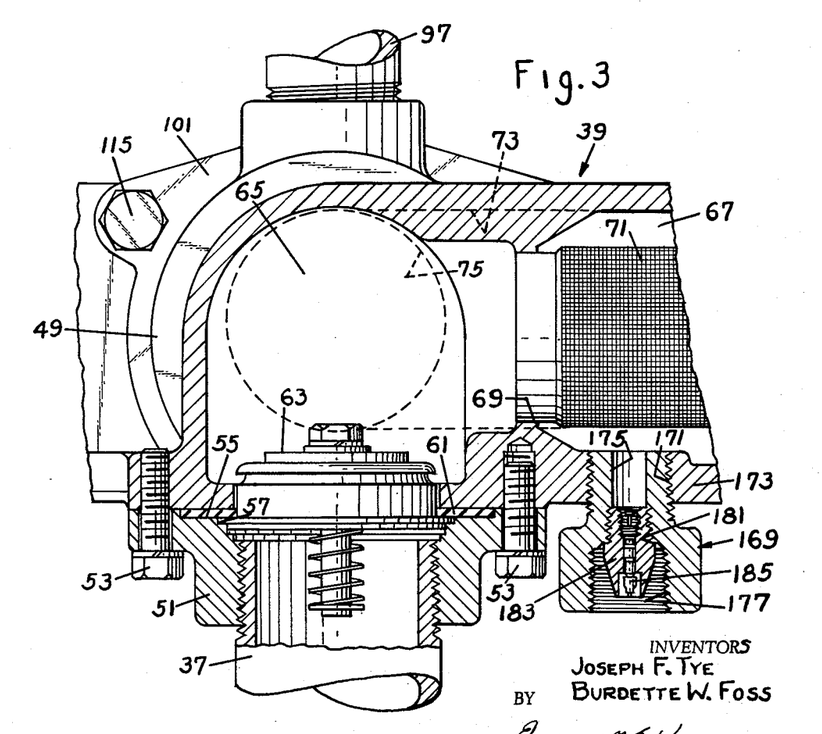
FIGURE 3 is a sectional view taken on the line 3—3 of FIGURE 2 showing a fuel strainer and a pressure relief valve.

The inlet pipe 37 is joined to a body 49 of the balancing valve 41 by a flange 51 and cap screws 53 (FIGURE 3). The flange is provided with a pair of recesses 55 and 57 (FIGURE 3) to receive a gasket 61 for sealing the joint and a poppet type valve 63 respectively. The valve opens with flow from the motor-pump 7 to admit liquid into an inlet chamber 65 of the body 49.

The inlet chamber 65 communicates with a second chamber 67 by way of a port 69 which also serves as a seat for a strainer 71 so that the liquid flows from the chamber 65 through the strainer 71 and into the chamber 67. A passage 73 receives liquid from the chamber 67 and discharges it to a circular opening 75 in a wall 77 which separates the passage from an open-ended cavity 79 which when sealed by a piston 81 becomes a chamber.

A cylindrical cup-shaped member 83 is pressed into the opening 75 with its open end 85 in communication with the passage 73 and its closed end 87 within the chamber 79. The cylindrical wall 89 of the member is provided with a number of circumferentially spaced ports 91 adjacent the closed end. The ports 91 are preferably, generally triangular with the apex of the triangle directed toward the closed end.

A tapped discharge opening 93 is provided in the side wall 95 of the outlet chamber 79 to receive an outlet pipe 97. The open end of the chamber 79 is provided with a cylindrical bore 99 which is sealingly engaged by a double acting piston 81.

The end of the body 49 encompassing the bore 99 is provided with a radial flange 101 having bolt holes 103 and is also provided with an axial flange 105 which is concentric with the bore 99, for aligning the body 49 with a similar body 107 for the side 47.

The body 107 is made with a flange 109 having bolt holes 111 and is provided with a recess 113 for receiving the pilot flange 105 for aligning the holes 103, 111.

Bolts 115 pass through the holes 103, 111 and compress a gasket 119 which seals the joint between the two bodies.

The side 47 of the pressure balancing valve is identical with the side 39 except that it has the recess 113 instead of a flange 105 and does not have a cylinder like 99. The parts thereof of the side 47 are given different numerals to clearly distinguish it from the side 39. The pipe 45 is connected to the body 47 by a flange 123 and the joint is sealed by a gasket 125. The body on side 47 has a poppet valve 127; an inlet chamber 129; (second chamber, port and strainer not shown) a passage 131, an opening 133, a wall 135, an outlet chamber 137, a cup-shaped member 139, with the open end 141, the closed end 143, the cylindrical wall 145 and the ports 147, a tapped opening 149 from the outlet chamber, and an outlet pipe 151.

As shown in FIGURE 2, the piston 81 is mounted for reciprocation within the bore 99 and carries at one side thereof a sleeve valve 153 which extends into the outlet chamber 99 and is provided with a bore 155 which fits slidably over the cup-shaped member 83 and is reciprocated with respect thereto by the piston to regulate the effective opening of the ports 91. The diameter of the sleeve is enlarged adjacent the piston to provide a passage 157 for the liquid from ports 91 to ports 159 formed in the enlarged portion of the sleeve. Liquid passes from ports 159 to the outlet chamber 99 and the pipe 97.

Another sleeve valve 161, which is identical with 153, is also connected to the piston 81 at the other side thereof by a coupling 162 and extends into the outlet chamber 137. The sleeve valve is provided with a bore 163 which receives the cup-shaped member 139 and the valve is reciprocable on 139 to regulate the effective opening of the ports 147. The end of the valve adjacent the piston, is enlarged to provide a passage 165 connecting the ports 147 with ports 167 in the sleeve which communicate with the outlet chamber 137 and pipe 151.

It will be noted that as the sleeve valves 153, 161 move to the right from the position shown in FIG. 2, ports 91 will be closed and ports 147 will be opened. Also, due to the fact that the ports are generally triangular with apices pointing toward each other, a small axial displacement of the valves in said direction will cause ports 91 to be restricted rapidly and ports 147 to be enlarged rapidly. Thus a rapid adjustment of the flow to the outlet pipes 97, 151 is obtained in response to small differential pressure imposed on the piston 81.

The reverse is, of course, true when the piston shifts the valves toward the left (FIG. 2).

From the foregoing description it is apparent that when the pressures in chambers 79 and 137 are unequal, the difference in these pressures will cause the piston 81 to shift the sleeves 153 and 161 in the proper direction to adjust the flow of liquid to these chambers until the pressures are balanced. Thus during any delivery the pressures in the chambers and pipes 97, 151 are maintained substantially equal.

Referring to FIGURES 1 and 3, a fitting 169 is inserted in a threaded opening 171 in a wall 173 of the body 49 so as to communicate with the chamber 67 thereof. The fitting is provided with a bore 175 and two counterbores 177, 181. The counterbores are threaded. Counterbore 177 receives a standard tube fitting 179 and counterbore 181 receives a bushing 183 in which is mounted a relief valve 185.

As shown in FIGURE 1, a tube 187 extends from the fitting 179 into the storage tank 5 so that upon thermal expansion of the liquid which is trapped above the poppet valve 63, any excessively high pressure will open the relief valve 185 and bleed liquid to the tank. The body 47 is provided with a similar relief valve and a tube 189 for bleeding liquid to the storage tank 13.

METERS AND RELIEF VALVES

Referring to FIGURE 1, the pipe 97 is connected to an offset conduit 191, which in turn is connected to the inlet 193 of a positive displacement meter 195. The meter is supported by a bracket 197 which is fastened to the framework 19 and by a second bracket 199 attached to a cross-member 201 of the frame. The measured liquid discharged from the meter 195 through a valve 203, which is shown in detail in FIGURE 4. This valve includes a hollow body 205 secured to the meter 195, over the meter outlet 207 by cap screws 209. The valve body fits over a valve seat 211 which rests on the meter and is received in a bore 212 of the body.

Figures 4, 5, 5A:
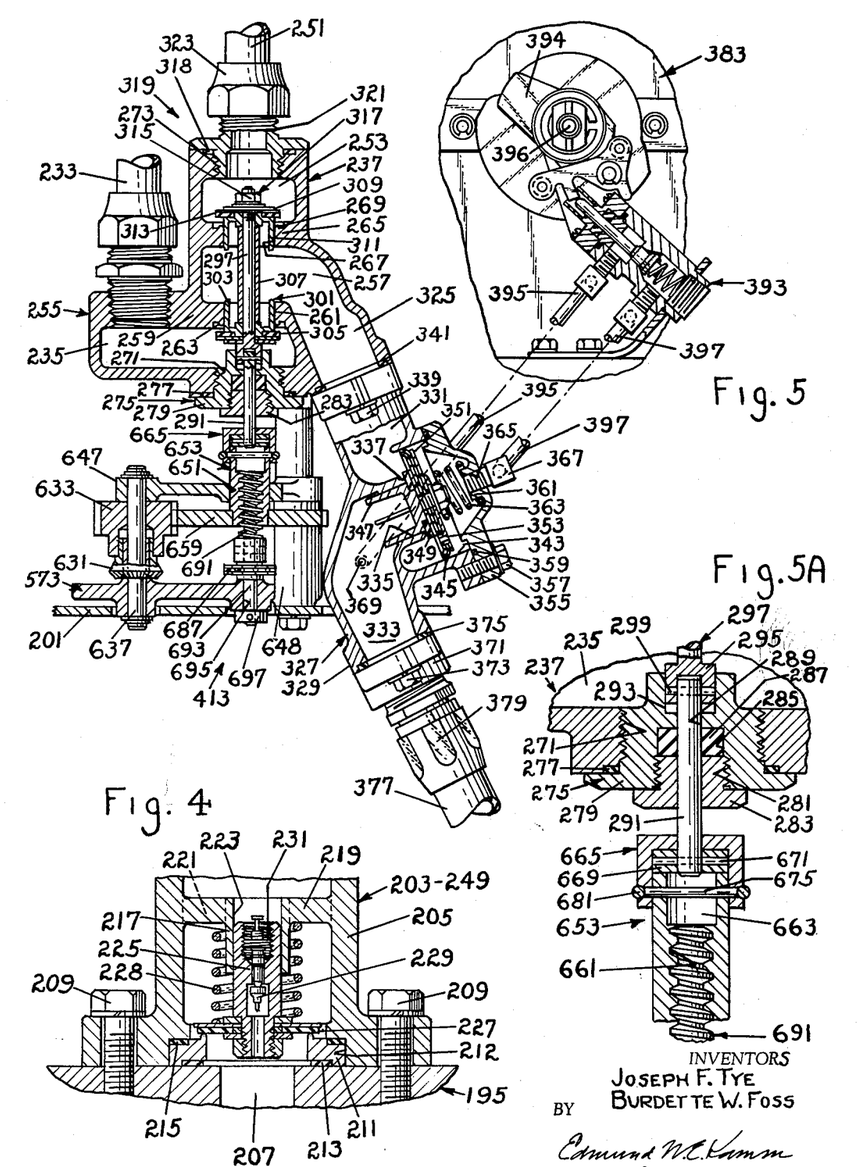
FIGURE 4 is a detailed view of a combination check and pressure relief valve.
FIGURE 5 is an elevation with parts in section showing the blending valve and a portion of the differential drive apparatus for positioning the blending valve.
FIGURE 5A is an enlarged fragmentary section showing the method for coupling the blending valve to the differential drive.

Gaskets 213 and 215 are disposed between the meter and seat and between the seat and the body respectively so as to be compressed to seal the joints between these parts when screws 209 are drawn down. The body is also provided with a guide 217 which is supported by spokes 219 extending inwardly from the body to provide openings 221 for passage of liquid. The guide has a central bore 223 for receiving the hollow stem 225 of a poppet valve 227. A relief valve 229 is mounted in the hollow portion 231 of the stem 225 to relieve excess pressure above the poppet 227 caused by thermal expansion of the liquid. Valve 227 is urged closed by a spring 228 and opens with the flow from the meter.

BLENDING OR PROPORTIONING VALVES

The discharge side of the combination poppet and pressure relief valve 203 is connected to a tube 233 (FIG. 1) which discharges into one inlet chamber 235 of a blending or proportioning valve 237 (FIGURE 5).

Returning to the side 47 of the balancing valve 41 (FIGURES 1 and 2), the outlet pipe 151 is connected to an offset conduit 239 which is in communication with the inlet 241 of a second positive displacement liquid meter 243 which is attached to the framework by brackets 245 and 247 and the cross member 201. The discharge from the meter 243 passes through a combination poppet and pressure relief valve 249 which is identical with the valve 203, shown in FIGURE 4, and through a tube 251 into a second inlet chamber 253 of the blending valve 237 (FIGURE 5).

The body 255 of the blending valve defines the inlet chamber 235 and 253 and a separate blending chamber 257. The latter is defined in part by a wall 259 of chamber 235 having a port 261 with a valve seat 263 facing this chamber and by a parallel wall 265 of chamber 253 having a port 267 with a valve seat 269 facing this chamber. Ports 261 and 267 are in vertical alignment with each other and with threaded openings 271 and 273 through the exterior walls of said chambers respectively to provide access to the chambers for assembling the blending valve unit. As shown particularly in FIGURE 5A, the opening 271 is closed by a flanged bushing 275 and a gasket 277 which is compressed between the valve body and the flange 279 of the bushing to seal the joint therebetween. The bushing has a threaded, axial counterbore 281 entering from its exterior end, for receiving a packing nut 283, a recess 285 for packing 287, a bearing 289 for a valve actuating shaft 291, and a counterbore 293 at its inner end to receive and radially support coupling member 295 which is formed on the lower end of the valve rod 297. This shaft extends upwardly through the ports 261 and 267. The upper end of the shaft 291 enters coupling member 295 and is held thereon by a pin 299.

A poppet valve 301 comprising a guide 303 and a valve disc 305, is mounted on the rod 297 in coaction with the seat 263. A hollow spacer 307 encircles the rod 297 and abuts the guide and a second poppet 309, comprising a guide 311 and a valve disc 313, is mounted on the rod 297 with the disc adapted to coact with the seat 269. The upper end of the shaft 297 is threaded to receive a nut 315 which holds the parts of the poppet assembly 317. The length of the spacer determines the axial distance between the active surfaces of the valve discs, which is greater than the corresponding distance between the valve seats 263, 269, so that as the assembly is reciprocated, one valve will restrict its port while the other is increasing the effective area of its associated port.

The access opening 273 is enclosed by a gasket 318 and a flanged bushing 319 having a threaded male boss 321 extending upward to receive the fitting 323 on the tube 251. The blending chamber 257 has an outlet 325 which is in communication with a flow control valve 327.

FLOW CONTROL VALVE

As shown in FIGURE 5, the flow control valve has a body 329 defining an inlet chamber 331, an outlet chamber 333 and a discharge port 335 having an annular valve seat 337. The bodies of the control and blending valves have mating flanges which are held together by cap screws 339 and the joint is sealed by a gasket 341. The body also defines a cylinder 343 which is disposed substantially concentrically with the port 335. A combined piston and poppet valve 345 is provided which comprises a guide 347, which is reciprocably guided in port 335, a valve disc 349 which is adapted to coact with the seat 337 and a piston 351 for the cylinder 343. A restricted orifice 353 is formed in the piston. A cap 355 closes the outer end of the cylinder 343 and it and a gasket 359 are held in sealing engagement with the valve body 329 by cap screws 357. The cap is provided with an internal boss 361 in axial alignment with the port 335 to provide a seat for a spring 363 which urges valve disc 349 toward seat 337. The boss is drilled and tapped at 365 to receive fitting 367 of tube 397. The body is also drilled and tapped to receive a similar fitting (not shown) of tube 395 which is in communication with the discharge chamber 333 at 369.

A flange 371 is attached to the control valve body in communication with the discharge chamber by cap screws 373 and a gasket 375 seals the joint. A discharge hose 377 (FIGURES 1 and 5) having a threaded male fitting 379 is screwed into the flange and a nozzle 381 of any desired kind is attached to the other end of the hose.

The operation of the control valve and its function will be described below:

REGISTER DRIVE MEANS

Figure 6:
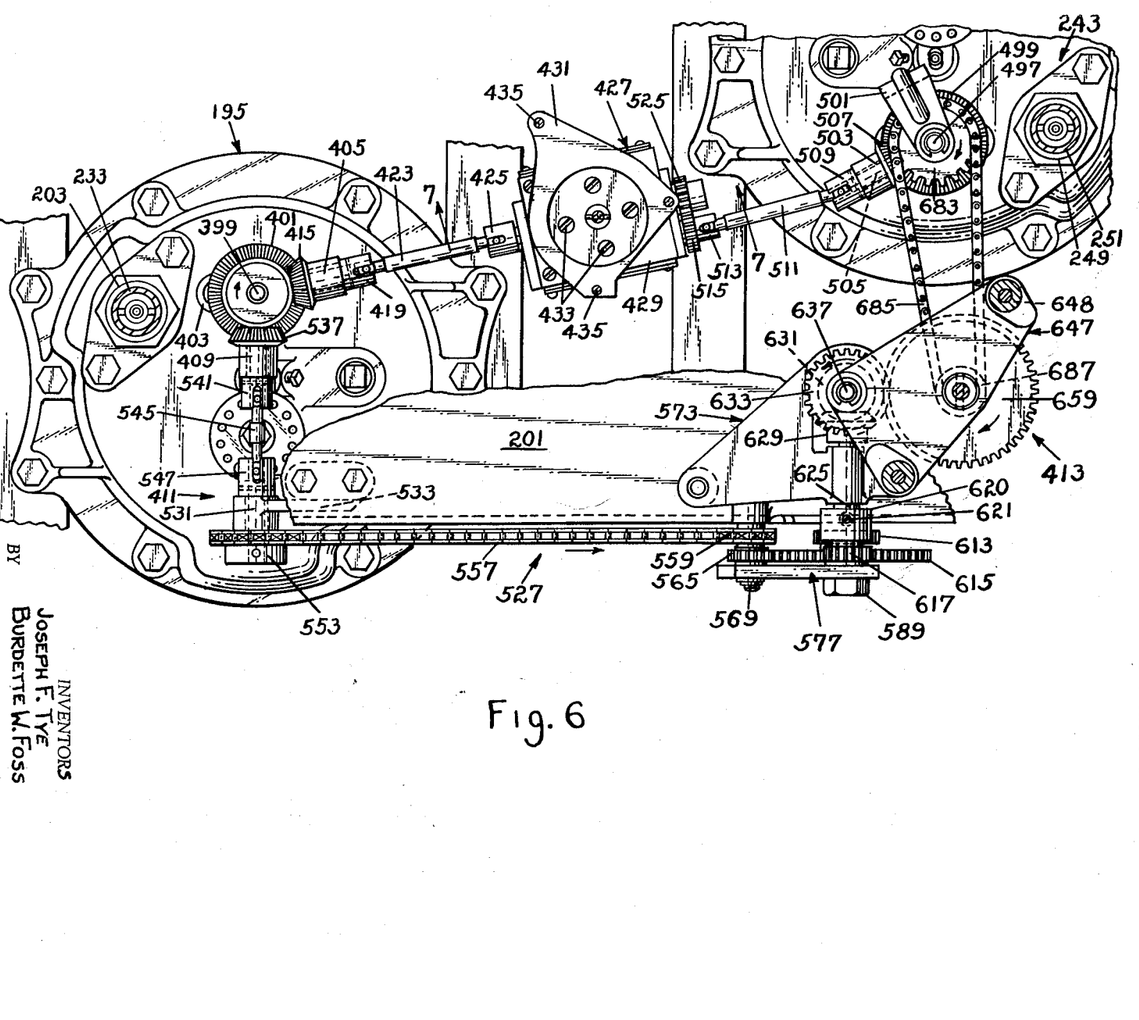
FIGURE 6 is a sectional view taken on the line 6—6 of FIGURE 1 showing apparatus for positioning the blending valve.
Figures 7, 11:
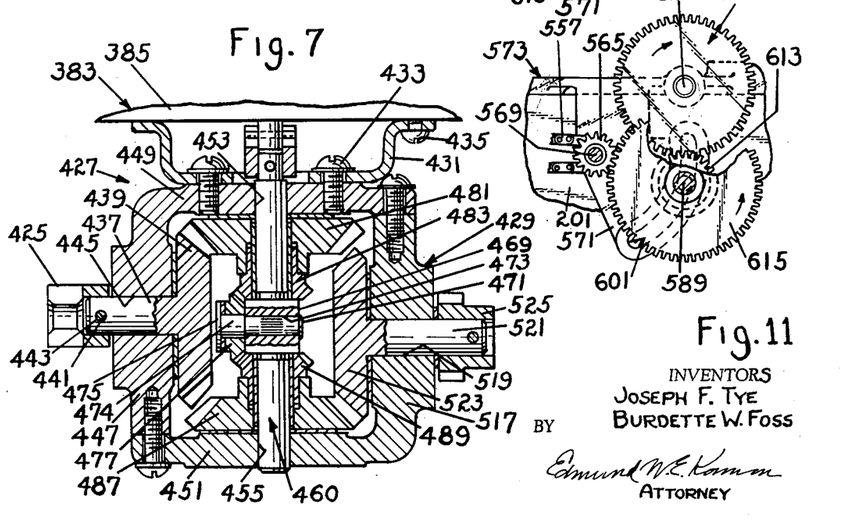
FIGURE 7 is a sectional view of a differential for adding the outputs from the two meters and is taken on the line 7—7 of FIGURE 6.
FIGURE 11 is an elevation similar to FIGURE 8 with gearing to provide a 9 to 1 blend ratio.

Referring to FIGURES 1, 6 and 7, the meter 195 has a vertically extending output shaft 399 carrying a 32-tooth bevel gear 401, which when viewed from the top in FIGURE 6, rotates in a clockwise direction at the rate of four revolutions per U.S. gallon.

A bracket 403 is fastened to the top of the meter 195 and has two upturned arms which support bearings 405 and 409. The axes of the bearings are disposed so as to radially intersect the axis of gear 401. Sixteen tooth miter pinions 415 and 537 are journalled in bearings 405 and 409 so that their hubs project beyond the outer ends of the bearings and the socket members 419, 541 of universal joints are mounted on the projecting hub ends. The pinions are thus prevented from axial movement in the bearings and are held in proper mesh with gear 401.

A shaft 423 having a ball and cross-pin member of a universal joint at each end thereof, has one of the ball-pin members mounted in the socket member 419 and the other member mounted in a similar socket member 425 which serves as one input shaft of an adding differential mechanism 427.

The gearing for the differential is enclosed in a housing 429 which is suspended from the bottom of the variator 385 by means of an adaptor 431 (FIG. 7) which is fastened to the differential housing by screws 433 and to the variator by screws 435.

The socket member 425 described above, is fastened to the shaft 437 of a 21-tooth miter gear 439 by a pin 441 inserted in a cross-hole 443. The shaft 437 is journalled in a bearing hole 445 in the side wall 447 of housing 429.

The upper and the lower walls 449 and 451 of the housing 429 respectively, define coaxial bearings 453 and 455 in which an output shaft 460 is rotatably journalled. The central portion 469 of shaft 460 is square in cross section and is cross-drilled at 471, perpendicular to two of the opposite faces and so as to intersect the axis of the shaft. The shank 473 of a shouldered rivet 475 is mounted in opening 471 and the shouldered portion 474 serves as a bearing for a 24-tooth, planetary miter gear 477 which meshes with two sun gears 483, 489 which are journalled on shaft 460 on opposite sides of the square portion 469 thereof which serves as the carrier of the planet gear 477.

Sun gears 483 and 489, each having 24 teeth, are connected to rotate with the larger, 21-tooth, miter gears 481, 487 respectively which are also journalled for rotation on shaft 460 and are disposed between the sun gears and the corresponding walls of the housing. Gear 481 meshes with miter gear 439 which is driven by meter 195 as described above. Gear 487 meshes with a 21-tooth miter gear 523 which has its shaft 521 journalled in the housing parallel to, but not concentric with, shaft 437 of gear 439. The outer end of shaft 521 has fixed to it an 18-tooth spur gear 525 which is driven by meter 423 as will be described below.

It will be seen that the mechanism just described will rotate the output shaft 460 of the differential mechanism 427, a number of revolutions equal to the sum of the revolutions made by the output shaft 399 and 497 of the meters 195 and 243 if each meter makes the same number of revolutions per gallon (4 r.p.g.) in the same direction. Thus if the output of meter 195, in any delivery, is 4 gallons and that of 243 is 2 gallons, shafts 399 and 497 will rotate 16 and 8 revolutions respectively in the same direction. Gears 401 and 415 have a ratio of 1 to 2 as do gears 499 and 507, so that gear 439 (FIG. 7) and gear 523 are driven 32 and 16 revolutions respectively. The ratios of gear sets 439, 481; 487, 523 and 525, 515 are 1 to 1 so that the sun gears 488 and 489 will be driven 32 and 16 revolutions respectively. Since the planetary gear 477 has the same number of teeth as the sun gears, the carrier block 469 and the output shaft 460 will rotate half the number of revolutions that sun gear 483 does, or 16 revolutions, and also half the number of revolutions that sun gear 489 rotates, or 8 revolutions. Thus shaft 460 is rotated exactly the same number of revolutions as the respective meter shafts. Since both of the sun gears rotate in the same direction, the revolutions imparted to the planetary carrier and shaft 460 is the sum of the individual movements imparted to it or 16 plus 8 or 24 revolutions.

The shaft 460 drives the variator 383 which, as is well understood, multiplies the number of gallons dispensed by the price per gallon and displays the total sale on the resettable register 387 which is viewed through the openings 27 (FIG. 1).

The shaft also drives a resettable gallons register 388 which registers the total output from both meters in terms of gallons and tenths of gallons.

These registers are set by power means which are rendered effective by manual rotation of the control level 389 (FIG. 1) from an initial to a predetermined position at the beginning of a dispensing operation. Further rotation of the lever to a second position in which a motor control switch or switches (not shown) are closed to start the motor pumps 7 and 15 and a pilot valve 393 is opened, is possible only after the resetting of the registers is completed. When the lever 389 is returned to its initial position, the switches are opened and the pilot valve is closed.

The details of the control structure just described are fully set forth in U.S. Patent No. 3,045,868, issued July 24, 1962 to Harold E. Carnagua et al.

As shown in FIG. 5 hereof, the pilot valve 393 has its inlet and outlet connected to the tubes 395, 397 described above which run to outlet chamber 333 and the cylinder 343 of the flow control valve 327. Thus with the pilot valve open, the control valve disc 349 will be lifted from its seat by the pressure in chamber 331, whenever the nozzle valve is opened to relieve the pressure in the cylinder 343. Whenever the nozzle valve or the pilot valve is closed the pressure in the cylinder will equalize with that in chamber 331 and spring 363 will close the disc on its seat so that no liquid can flow to the nozzle.

The pilot valve is actuated by a cam 394 mounted on the shaft 396 which is operable in time with the control lever 389, so that the valve cannot be opened before the registers have been reset and will be closed when the lever is returned to its initial position.

The output shaft from the meter 243 is indicated by the numeral 497 (FIG. 6) and is longer than the shaft 399 of the meter 195. A 32-tooth miter gear 499 is connected to be driven by the shaft 497 and a bracket 501 is fastened to the top of the meter to provide a bearing 503 in which the hub 505 of a 16-tooth bevel pinion 507 is mounted so as to mesh with the gear 499. A universal joint socket 509 is fastened to the end of the hub which projects beyond the bearing 505 and receives one ball and pin end of drive shaft 511. The other ball end of the shaft enters a universal socket 513 formed integrally with an 18-tooth spur gear 515 (FIGURE 6) which is mounted for rotation on the exterior of the side wall 517 of the differential housing 429 and which meshes with the gear 525.

BLEND OR PROPORTION CONTROLS

A mechanism 527 for setting and controlling the proportion of the constituents forming the blend is shown generally in FIGURES 1 and 6, and includes the second output 411 from shaft 399, the meter 195 and the second output 413 from shaft 497, the meter 243. FIGURES 5, 8, 9 and 10 supplement the general FIGURES 1 and 6.

Referring to FIG. 6, it was stated above that the 32-tooth gear 401 on the meter shaft 399 drives a 16-tooth meter gear 537. The hub of this gear is connected, by shaft 545 and suitable universal joints 541, 547, to drive the hub of a 20-tooth sprocket 553 which is mounted for rotation in a bearing 531 on a bracket 533 which is fixed to depend from the frame cross-member 201.

Sprocket 553 drives a chain 557 which drives a 10-tooth sprocket 559 which is joined with a 15-tooth spur gear 565, both of which are mounted to rotate on a stud 569 (FIGS. 8, 9 and 11) which is fixed in a bracket 573. The latter is fastened to the upper side of frame member 201 by screws 575. An arm 577 is also pivotally mounted at one end on the stud and it with the gear and sprocket are held on the stud by a washer 581 and a snap ring 583.

Figures 8, 9, 10:
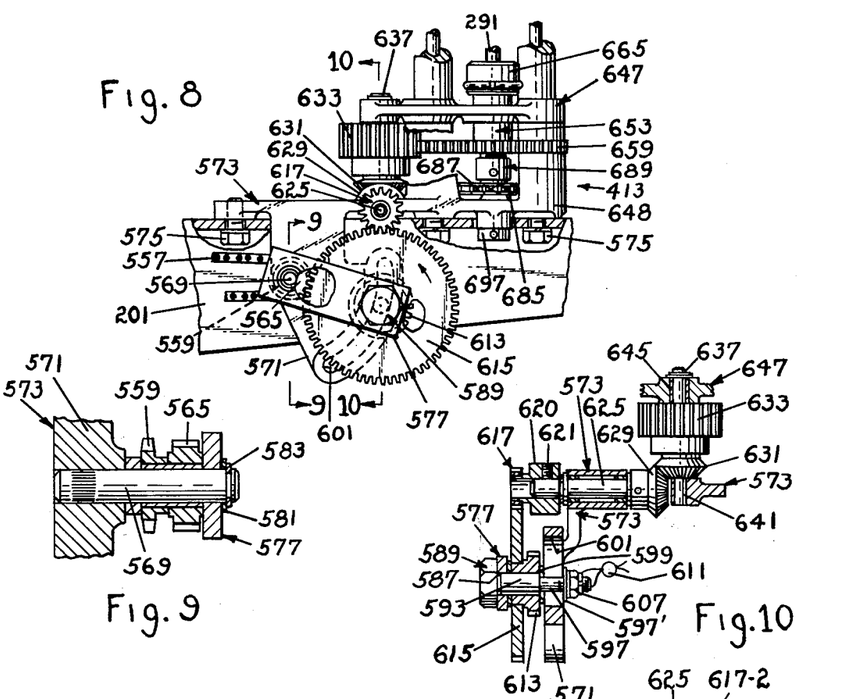
FIGURE 8 is an elevation of a portion of the apparatus for positioning the valve showing the gearing for a one to one blend ratio.
FIGURE 9 is a fragmentary section taken on the line 9—9 of FIGURE 8.
FIGURE 10 is a fragmentary section taken on the line 10—10 of FIGURE 8.

As shown in FIGS. 8 and 10, the other end of arm 577 is perforated at 587. A shouldered bolt 589 has its shank 593 extending through 587 and has a large, 60-tooth spur gear 615 and a small 24-tooth gear 613 rotatably mounted on said shank. Said gears are fixed together and gear 615 meshes with gear 565 (FIG. 8) and drives the gear 613. It also meshes with and drives a change gear 617 which is removably fixed to one end of a shaft 625, by means of a set screw 621, which passes through the enlarged hub 620 of this gear. Shaft 625 is rotatably mounted in, and passes through, a bearing which is supported by the bracket 573.

The vertical leg 571 of bracket 573 is also provided with an arcuate slot 601 disposed on a radius centered on the stud 569 so that the arm 577 may swing on the stud and the bolt 589 together with gear 615 may be swung toward and away from the change gear 617 so as to mesh with change gears having different pitch diameters as will be explained below. The reduced end 597 of bolt 589 extends through the arcuate slot through washers 597′, 599 on either side thereof and a nut 607 is provided to draw up the bolt so as to hold the arm in its adjusted position. The nut is preferably a castellated nut and the end of the bolt is preferably perforated. The castellations and perforations are adapted to receive a seal 611 so that the nut cannot be loosened or removed without breaking the seal.

The other end of shaft 625 has a 16-tooth miter gear 629 fixed to it which meshes like gear 631 (FIGS. 5 and 10) rotatably mounted on a shaft 637 which is supported in aligned openings 641 and 645 in the bracket 573 and in a bearing plate 647 respectively. The plate 647 is mounted on bosses 648 of the bracket 573 and which extend upwardly therefrom. Gear 631 is fixed to and drives a 30-tooth spur gear 633 which meshes with a 60-tooth spur gear 659. The gear 659 is fixed to and drives a cylindrical, differential nut 653 which serves as the hub for the gear and which extends through and is guided in an opening 651 in the bearing plate 647. The upper end of the nut is coupled to the lower end of the proportioning valve actuating shaft 291 by the structure which is shown, in detail, in FIG. 5A. The lower end of the actuating shaft 291 has an inverted, cylindrical cup 665 rotatably mounted on the shaft 291, coaxially therewith. A circular collar 669 which fits freely inside of the cup, is fastened to the end of the shaft by a pin 671. Thus the collar may rotate freely within the cup.

The upper end of the nut 653 enters the cup and its upper end is held closely adjacent the bottom of the collar by means of a pin 675 which extends through the nut and the skirt portion of the cup. Thus the cup and nut will rotate together relative to the collar and valve actuator but as the nut moves downwardly, the cup will pull the shaft 291 with it to move valve 305 away from seat 263 and valve 313 toward its seat. When the nut rises, the upper end thereof will push the collar 669 and shaft 291 to reverse the action of the valves. The clearances between the collar 669 and the respective portions of the cup and nut which engage and move it are such that the cup and nut rotate freely with respect to the collar and so that there is very little axial lost motion between these parts, to the end that the valves move in exact synchronism with the nut.

The interior threads 661 of the nut are preferably double, left hand, stub Acme type which terminate in a counterbore 663 so that the screw 691 which enters the nut, can extend entirely therethrough without jamming and so that the nut threads can be formed accurately to the proper dimensions and shape.

The differential screw 691 is provided at its upper end with threads which mate with those of the nut, and at the other end with a journal 693 which is rotatably supported in a bearing opening 695 in bracket 573. A 10-tooth sprocket 687 is fixed concentrically to the screw, above the bracket, and a collar 697 is fixed to the journal below the bracket. These parts cooperate to hold the screw against material axial movement. Such lost motion as well as axial lost motion between the threads of the screw and nut must be minimized if the valves are to respond quickly and accurately to the differential action of the screw and nut, which constitute a differential mechanism as will be explained below.

It will be noted that the spur gear 633 has a much wider face than gear 659 which is fixed to the nut for the purpose of maintaining full axial engagement of these gears as gear 659 and the nut move up and down on the screw.

The sprocket 687 is driven by a chain 685 which is in turn driven by a 20-tooth sprocket 683 which is fixed to the output shaft of meter 243 (FIG. 6).

It will thus be seen that the screw 691 will be driven by its drive train in the same direction as the output shaft 499 of the meter at twice the speed of this shaft. The drive train which connects the meter shaft 399 with the nut, when the values of the gears and sprockets given above are used, will also drive the nut at twice the speed of the meter shaft 399 because the value of the gearing is:

$$32/16 \times 20/10 \times 15/60 \times 60/15 \times 30/16 = 2$$

It will be seen from FIG. 6 that the gear 659 which drives the nut will rotate in the same direction as the sprocket 683 which drives the screw. Thus so long as the screw and nut are rotating in the same direction at the same speed there will be no relative, axial motion of one with respect to the other and there will be no movement of the proportioning valves.

Should the speed of meter 243 increase or that of meter 195 decrease relative to the speed of the other, the screw will rotate faster than the nut, and since the threads are left hand, the screw will pull the nut downwardly, opening the valve port 263, which will increase the flow of the low fuel and the speed of meter 195 and simultaneously to throttle the port 269 thereby decreasing the flow of high fuel, and slowing the meter 243. Thus the rotative speeds of the screw and nut are brought toward equality and when they reach equal speeds, the valve movement will stop and the meters will rotate in synchronism again. This adjustment occurs very rapidly due to the relatively large pitch of the threads used in the differential and due to the fact that corrective action starts immediately upon loss of synchronism between the meters. Thus the proportional accuracy of the blend is closely maintained.

Should the speed of meter 243 decrease or that of 195 increase, it will be obvious that the nut will rotate faster than the screw so that the nut will move upwardly relative to the screw. The valves will also move upwardly to increase the flow of high fuel and the speed of meter 245 and decrease the flow of low fuel and the speed of meter 195. The speed of rotation of the nut is slowed while that of the screw increases toward equality, at which point the movement of the valves ceases and the meters are again synchronized.

It will be noted that when the gear trains driving the nut and screw have the same value 2:2, the meters will run at the same speeds. Thus if the nozzle valve is opened to dispense at any particular rate, for example 10 gallons a minute, each meter will deliver at the rate of 5 gallons a minute hence the constituents will be blended in the ratio of 1 to 1.

In order to enable the proportioner to deliver blends of different ratios, provision is made for changing the value of the train which drives the nut. This is accomplished by substituting different gears having different numbers of teeth, for the gear 617 shown particularly in FIGS. 10 and 11 and variously meshing such gear either with gear 615 (60 teeth) or gear 613 (24 teeth).

The following table shows a series of ratios of low fuel to high fuel which can be blended and the combinations of gears 615, 613, and seven different gears 617 which can be made to attain these ratios.

Table

| Blend Ratio—Low Fuel: High Fuel | Drive Gear | | Driven (Change) Gear | |
|---|---|---|---|---|
| | Gear | No. of Teeth | Gear | No. of Teeth |
| 1:1 | 615 | 60 | 617 | 15 |
| 2:1 | 615 | 60 | 617-1 | 30 |
| 3:1 | 615 | 60 | 617-2 | 45 |
| 4:1 | 613 | 24 | 617-3 | 24 |
| 5:1 | 613 | 24 | 617-4 | 30 |
| 6:1 | 613 | 24 | 617-5 | 36 |
| 7:1 | 613 | 24 | 617-6 | 42 |
| 8:1 | 613 | 24 | 617-7 | 48 |

It will be seen from the above table that the three blend ratios 1:1, 2:1 and 3:1 are obtained by having gear 565 (15T) drive 615 (60T) which in turn drives gear 617 (15T). In the equation shown above these gears represent the 3rd and 4th factors $15/60 \times 60/15$ which is obviously a 1:1 ratio and when multiplied by the first factor 32/16 the total value of the equation is 2.

When gear 617-1 (30T) is substituted for gear 617, the value of the train becomes ½ × 2 or 1 times the speed of the low meter, consequently, in order to rotate the screw and nut at the same speed, the low fuel meter must operate at twice the speed of the high fuel meter hence two parts of low fuel will be dispensed for each one part of high fuel so that the blend ratio is 2:1. Following the same logic, when gear 617-2 (45T) is used, the train value becomes $2 \times 15/60 \times 60/45 = \frac{2}{3}$ and meter 195 must rotate three times as fast as 243 to maintain the nut and screw at equal speeds and the ratio becomes 3:1.

In the remaining five blends, the drive as shown in FIG. 11 becomes somewhat different in that gear 565 (15T) drives 615 (60T) but gear 613 (24T), which rotates with 615, is meshed with whatever gear is used in the place of 617 (15T).

Thus the value of the train for a 4:1 blend which uses gear 617-3 (24T) is:

$$2 \times 15/60 \times 24/24 = \frac{1}{2}$$

so that meter 195 must rotate four times as fast as 243 and the blend ratio becomes 4:1.

It is of course obvious that gears 617-3 to 617-7 which are intended to mesh with gear 613 will be provided with shorter hubs so that when they are mounted on shaft 625, the gears will be disposed in the same plane as gear 613. Gears 617-1 and 2 will be like 617. As seen in FIGS. 8 and 11, the arm 577 is freed by loosening nut 607 (FIG. 10) and may be swung toward whatever gear is used on shaft 625 so as to mesh the gear 613 or 615 with it. Gear 615 remains in mesh with 565 at all times.

It is obvious that the examples given do not exhaust the number of blend ratios which are within the range of the apparatus disclosed herein. The change gear 617 may have any number of teeth within the practical limits of the variable gear centers.

OPERATION

Referring to FIGURE 1, the dispenser 1 delivers a single product which is a blend of low and high fuels such as "regular" and "premium" gasoline. Therefore, the manual controls are the same as for a standard single product gasoline dispenser and are operated in the same manner.

To dispense a quantity of the blended gasoline the operator removes the nozzle 381 from the nozzle boot 391 and rotates the lever 389 counterclockwise to initiate a sequence of operations, including resetting the registers 29 and 31 to zero at the end of which operation, the switches 250 for the motor-pump units 7 and 15 are closed to start said units and the pilot valve 393 is opened. Thereafter, the rate of delivery is controlled by the valve of the nozzle 381, which may be either a manual type or an automatic shut-off type. Once the pilot valve is opened, the control valve 327 will open and close with the nozzle valve. If the register has not been reset, the pilot valve will remain closed and opening of the nozzle valve will have no effect.

The ratio of the constituents of the blend is set either at the factory or by an authorized service man, so that the proper gears 613, 615, 617 are in place and placed in mesh, locked and sealed, so that the operator has no unusual services to perform.

MODIFIED FORM—MOTOR PUMP BLENDER
(FIGURE 12)

Figure 12:
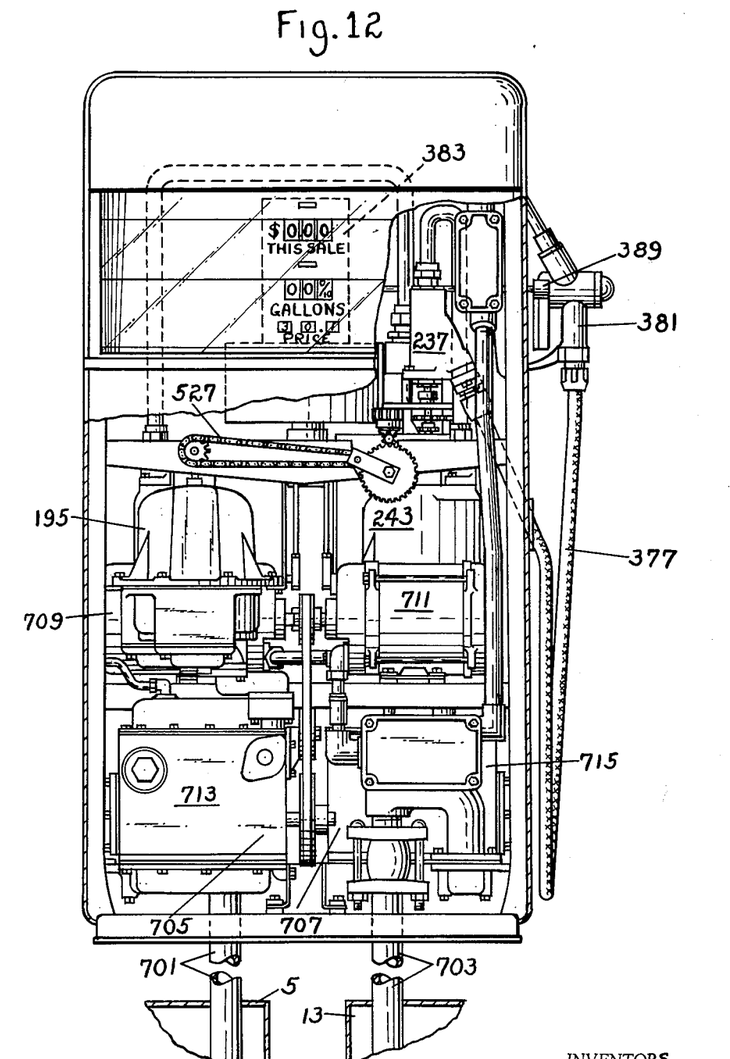
FIGURE 12 is an elevation of a service island type of blending dispenser equipped with motor pumps and air separators for the constituent fuels.

Instead of being provided with remotely located submerged motor pumps as shown in FIGURE 1, some forms of dispensers utilize motors, pumps and air separators which are built into the dispenser as shown in FIGURE 12.

Such a system requires the tanks 5 and 13 which are connected by suction lines 701, 703 respectively to the positive displacement pumps 705, 707 are driven by electric motors 709, 711 and which discharge into air separators 713, 715. The gas free liquid may be discharged directly into the meters 195 and 243 instead of passing through the pressure balancing valves 39, 47 shown in FIG. 1, although such valves may be used if desired. The proportioning apparatus, registers, variator and all of the other parts of the dispenser used in this form are the same in construction and operation as those used in the apparatus of FIG. 1, and described in detail above, with the exception that the pilot valve 393 and associated control valve 327 may be omitted if desired since it is not required except in cases in which any of the motor pumps supply more than one outlet.

MODIFIED FORM—REMOTE BLENDER (FIGURE 13)

Figure 13:
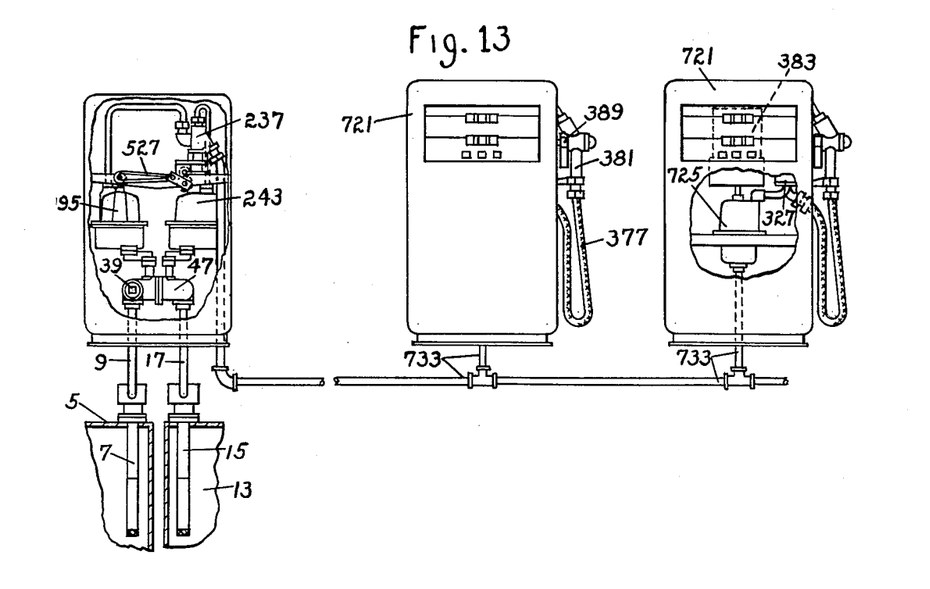
FIGURE 13 is a system view showing two remote island dispensers of the usual type connected to be supplied from an above ground or pit type remote blender which is supplied from remotely located motor pumps.

In the form of the invention shown in FIG. 13, the meters 195, 243 are supplied by remote motor pump units 7, 15 through pressure balancing valves 39, 47 and the proportioning mechanism 527 (FIG. 6) and proportioning valve 237 (FIG. 5). These valves and mechanism are all disposed in a housing separate and distinct from the dispensers 721.

The outlet from the proportioning valve 275 (FIG. 5) is connected by piping 733 with one or more dispensers 721. Each dispenser has a meter 725, a control valve like 327, a computer 383 with a pilot valve 393, a hose 377, nozzle 381, motor switches and control lever 389. These elements may accordingly be omitted from the remote blending apparatus housed in the chassis 727 as may the totalizer mechanism 415, 427, 507 shown in FIG. 6.

Whereas the two forms of apparatus shown in FIG. 1 and FIG. 12 respectively are adapted to supply only one hose outlet with a blended fuel, the apparatus of FIG. 13 is capable of supplying several individual dispensers.

MODIFIED FORM—MOTOR PUMP REMOTE BLENDER (FIGURE 14)

This form of the invention is like that shown in FIG. 13 in that one remote type of blender is capable of serving several dispensers 721. The difference lies primarily in the fact that instead of being supplied from remote motor pump units through pressure balancing valves as in FIGS. 1 and 13, the blender is supplied from motor driven pumps 731, 733' equipped with air separators 735, 737 which discharge directly into the meters in the same manner as shown in FIG. 12. The pumps are supplied from tanks 5 and 13 by suction pipes 739, 741 and the pumps are simultaneously controlled by switches located in both of the dispensers.

SYSTEMS

Figure 14:
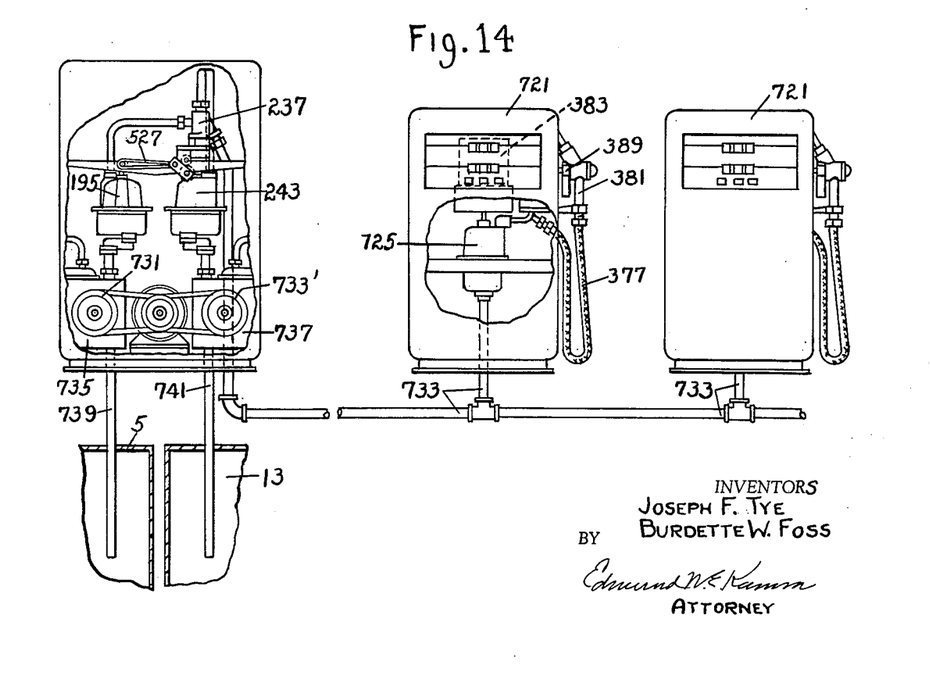
FIGURE 14 is like FIGURE 13 except that the above ground or pit type remote blender is supplied from motor pumps and air releases built into the blender.

It is of course obvious that the dispensers shown in FIGS. 1 and 12 must be located on the dispensing island or point where the customer stops his car for service. In the modifications of FIGS. 13 and 14, only the dispensers 721 are so located while the blenders may be located at any suitable point, above ground, in an underground pit, close to or remote from both or either the tanks and the dispensers.

Accordingly, various choices are presented as to the system to be employed in a particular service station by combining the motor pumping units, the proportioning apparatus, the registering and dispensing apparatus and the controls in various groupings.

It is obvious that various changes may be made in the form, structure and arrangement of parts of the specific embodiments of the invention disclosed herein for purposes of illustration, without departing from the spirit of the invention. Accordingly applicants do not desire to be limited to such specific embodiments but desire protection falling fairly within the scope of the appended claims.

We claim:

1. A proportioning mechanism having 1st and 2nd liquid meters for measuring the flow of liquid constituents of a blend and having means for supplying the constituents under pressure to said meters, said mechanism comprising,
   (a) a valve body defining 1st and 2nd inlet chambers, an outlet chamber and 1st and 2nd ports connecting said 1st and 2nd chambers with said outlet chamber respectively,
   (b) means connecting said 1st and 2nd meters in communication with said 1st and 2nd chambers,
   (c) 1st and 2nd valves for said 1st and 2nd ports respectively, means mounting said valves for simultaneous movement in one direction to enlarge and restrict said 1st and 2nd ports and in another direction to restrict and enlarge said 1st and 2nd ports respectively,
   (d) a differential mechanism comprising mating screw and nut members, means mounting said members for independent rotation, and one of said members for axial movement relative to the other,
   (e) means for transmitting the axial movement of said axially movable member to said valves,
   (f) means connecting said 1st meter to rotate one of said members in one direction,
   (g) means connecting said 2nd meter to rotate the other member in the same direction, whereby said axially movable member will move said valves toward, and maintain them in, positions relative to their respective ports at which said meters rotate said members at the same speed, thereby establishing and maintaining a particular ratio of the flows through the respective meters.

2. The structure defined by claim 1 which includes a drive train connecting one of said meters to rotate one of said differential mechanism elements, said train comprising,
   (a) a 1st gear mounted for rotation about an axis,
   (b) a carrier arm mounted for pivoting about said axis and having a 1st shaft disposed in parallel, spaced relation to the axis,
   (c) 2nd and 3rd gears mounted for rotation on said shaft and connected to rotate together, one of said gears being in continuous mesh with 1st gear,
   (d) a 2nd shaft mounted for rotation about an axis parallel to said 1st shaft,
   (e) means for removably and adjustably mounting a 4th gear on said 2nd shaft, in the path of, and for individual selective meshing engagement by, said 2nd and 3rd gears, upon rotation of said carrier arm,
   (f) and means for locking said carrier arm with the desired gears in meshing engagement.

3. The structure defined by claim 2 which includes a plurality of 4th gears having different numbers of teeth for selective, individual engagement with said 2nd and 3rd gears to produce a series of predetermined speed ratios of said meter relative to the differential mechanism member driven by said meter through said train.

4. The structure defined by claim 1 wherein said means defining said inlet and outlet chambers, comprises,
   (a) four generally parallel, spaced, superposed walls, the interior two walls being common to said outlet chamber and to a different inlet chamber and defining the respective ports,
   (b) the outer walls each defining an enlarged opening, said ports and openings being substantially coaxial,
   (c) a valve rod extending from said 1st chamber through said outlet chamber into said 2nd chamber, a valve mounted on said rod in each said 1st and 2nd chamber for controlling the port thereof,
   (d) a valve actuator extending through one of said openings, a plug for said opening having a packing box for passing said actuator through said plug, (e) means for coupling one end of said actuator to said valve rod and the other end to the axially movable differential member, (f) and a conduit fitting mounted to close the other opening.

5. The structure defined by claim 4 wherein said coupling means are constructed and arranged so as to minimize axial lost motion between said differential member and said valve rod.

6. The structure defined by claim 4 wherein said coupling means between said actuator and said axially movable differential member is constructed and arranged to permit rotation of said member relative to said actuator.

7. A proportioning mechanism comprising 1st and 2nd liquid meters for measuring the flow of liquid constituents of a blend and 1st and 2nd motor pumps for supplying said constituents under pressure to said respective meters, said mechanism comprising, (a) a valve body defining 1st and 2nd inlet chambers, an outlet chamber and 1st and 2nd ports connecting said 1st and 2nd chambers with said outlet chamber respectively, (b) means connecting said 1st and 2nd meters in communication with said 1st and 2nd chambers, (c) 1st and 2nd valves for said 1st and 2nd ports respectively, means mounting said valves for simultaneous movement in one direction to enlarge and restrict said 1st and 2nd ports and in another direction to restrict and enlarge said 1st and 2nd ports respectively, (d) a differential mechanism comprising mating screw and nut members, means mounting said members for independent rotation, and one of said members for axial movement relative to the other, (e) means for transmitting the axial movement of said axially movable member to said valves, (f) means connecting said 1st meter to rotate one of said members in one direction, (g) means connecting said 2nd meter to rotate the other member in the same direction, whereby said axially movable member will move said valves toward, and maintain them in, positions relative to their respective ports at which said meters rotate said members at the same speed, thereby establishing and maintaining a particular ratio of the flows through the respective meters.

8. The structure defined by claim 7 wherein said motor pumps are mounted in a frame with said proportioning mechanism and an air separator is disposed between each pump and its corresponding meter.

9. The structure defined by claim 8 which includes (a) a separate dispensing apparatus comprising a meter, a resettable register connected to be driven by said meter, means for resetting said register to zero, control means connected to start said pumps only after said register has been reset, and a hose and valved nozzle connected to receive liquid from said meter, (b) and means for connecting the inlet of said last named meter to the outlet chamber of said valve body.

10. The structure defined by claim 9 wherein said dispensing apparatus includes a normally closed control valve for preventing the delivery of liquid from said dispensing apparatus until said register has been reset to zero.

11. The structure defined by claim 7 wherein said motor pumps are disposed at points remote from said proportioning mechanism, and (a) a frame for mounting said meters, proportioning mechanism and valve body, (b) a pressure control valve for each meter mounted in said frame, each valve having a discharge connected to supply one of said meters and having an inlet connected to receive liquid under pressure from one of said pumps, (c) and means responsive to the differential of the valve discharge pressures for adjusting said valves to equalize the valve discharge pressures.

12. The structure defined by claim 11 which includes (a) a separate dispensing apparatus comprising a meter, a resettable register connected to be driven by said meter, means for resetting said register to zero, control means connected to start said pumps, and a hose and valved nozzle connected to receive liquid from said meter, (b) and means for connecting the inlet of said last named meter to the outlet chamber of said valve body.

13. The structure defined by claim 12 wherein said dispensing apparatus includes a normally closed control valve for preventing the delivery of liquid from said dispensing apparatus until said register has been reset to zero.

14. A proportioning mechanism having 1st and 2nd liquid meters for measuring the flow of liquid constituents of a blend and having means for supplying constituents under pressure to said meters, said mechanism comprising, (a) a valve body defining 1st and 2nd inlet chambers, an outlet chamber and 1st and 2nd ports connecting said 1st and 2nd chambers with said outlet chamber respectively, (b) means connecting said 1st and 2nd meters in communication with said 1st and 2nd chambers, (c) 1st and 2nd valves for said 1st and 2nd ports respectively, means mounting said valves for simultaneous movement in one direction to enlarge and restrict said 1st and 2nd ports and in another direction to restrict and enlarge said 1st and 2nd ports respectively, (d) a differential mechanism comprising mating screw and nut members, means mounting said members for independent rotation, and one of said members for axial movement relative to the other, (e) means for transmitting the axial movement of said axially movable member to said valves, (f) means connecting said 1st meter to rotate one of said members in one direction, (g) means connecting said 2nd meter to rotate the other member in the same direction, whereby said axially movable member will move said valves toward, and maintain them in positions relative to their respective ports at which said meters rotate said members at the same speed, thereby establishing and maintaining a particular ratio of the flows through the respective meters, (h) each of said meters defining an inlet for liquid to be metered, (i) an individual source of constituent liquid under pressure for supplying each meter, (j) means connecting the inlet of each meter with its source of liquid, (k) and means responsive to the pressures of the liquids from both sources for equalizing the pressures of the liquids supplied to the meter inlets.

15. The structure defined by claim 14 which includes (a) a metering valve disposed in each connecting means, movable in opposite directions to throttle and increase the flow of liquid to said inlets, (b) means connecting said valves for simultaneous movement to throttle the flow to one meter and increase the flow to the other during movement of said connecting means in one direction and to increase the flow to said one valve and throttle that to the other during movement of said connecting means in the other direction, (c) and a means responsive to the differential of the pressures of the liquids from both of said sources for moving said connecting means to throttle the flow of the liquid having the highest pressure.

16. The structure defined by claim 15 wherein said pressure responsive means includes a double acting piston and said metering valves comprise sleeve valves connected for simultaneous operation by said piston.

17. The structure defined by claim 16 which includes strainers, one disposed between each source of liquid and the corresponding sleeve valve.

18. A fuel dispenser comprising a proportioning mechanism having 1st and 2nd liquid meters for measuring the flow of constituents of a blend and having 1st and 2nd motor pumps for supplying liquid under pressure to said respective meters, said mechanism comprising
   (a) a valve body defining 1st and 2nd inlet chambers, an outlet chamber and 1st and 2nd ports connecting said 1st and 2nd chambers with said outlet chamber respectively, a hose and a valved nozzle connected to receive the liquid discharged from said outlet chamber,
   (b) means connecting said 1st and 2nd meters in communication with said 1st and 2nd chambers,
   (c) 1st and 2nd valves for said 1st and 2nd ports respectively, means mounting said valves for simultaneous movement in one direction to enlarge and restrict said 1st and 2nd ports and in another direction to restrict and enlarge said 1st and 2nd ports respectively,
   (d) a differential mechanism comprising mating screw and nut members, means mounting said members for independent rotation, and one of said members for axial movement relative to the other,
   (e) means for transmitting the axial movement of said axially movable member to said valves,
   (f) means connecting said 1st meter to rotate one of said members in one direction,
   (g) means connecting said 2nd meter to rotate the other member in the same direction, whereby said axially movable member will move said valves toward, and maintain them in, positions relative to their respective ports at which said meters rotate said members at the same speed, thereby establishing and maintaining a particular ratio of the flows through the respective meters,
   (h) an adding differential mechanism connected to be driven by both of said meters and having an output shaft which is driven at the sum of the speeds of said meters,
   (i) a resettable register connected to be driven by said output shaft,
   (j) and control means for starting said motor pumps.

19. The structure defined by claim 18 wherein
   (a) said dispenser includes a frame, said meters, proportioning mechanism, register, register resetting means and pump starting means are mounted in said frame,
   (b) said 1st and 2nd motor pumps being mounted in said frame,
   (c) 1st and 2nd air separators mounted in said frame, connected to receive liquid under pressure from said 1st and 2nd pumps and to deliver gas free liquid to said 1st and 2nd meters respectively,
   (d) and means for preventing the starting of said motor pumps until said register has been reset to zero.

20. The structure defined by claim 18 wherein
   (a) said dispenser includes a frame, said meters, register, register resetting means and pump starting means are mounted in said frame,
   (b) said 1st and 2nd motor pumps being disposed remotely from said frame,
   (c) 1st and 2nd pressure control valves mounted in said frame, having inlets connected to receive liquid under pressure from said 1st and 2nd motor pumps and having outlets connected to supply said 1st and 2nd meters respectively,
   (d) means responsive to the differential of said valve outlet pressures for adjusting said valves to equalize said valve outlet pressures,
   (e) a control valve connected to receive liquid from said outlet chamber,
   (f) and means for preventing opening of said control valve until said register has been reset to zero.

References Cited in the file of this patent
UNITED STATES PATENTS

| 2,886,211 | McGaughey et al. | May 12, 1959 |
| 2,982,444 | McCoy | May 2, 1961 |
| 3,077,289 | Rupisarda | Feb. 12, 1963 |